Nov. 3, 1964    F. S. BUONO    3,155,134
BAG AND METHOD OF MAKING THE SAME
Filed Dec. 22, 1961
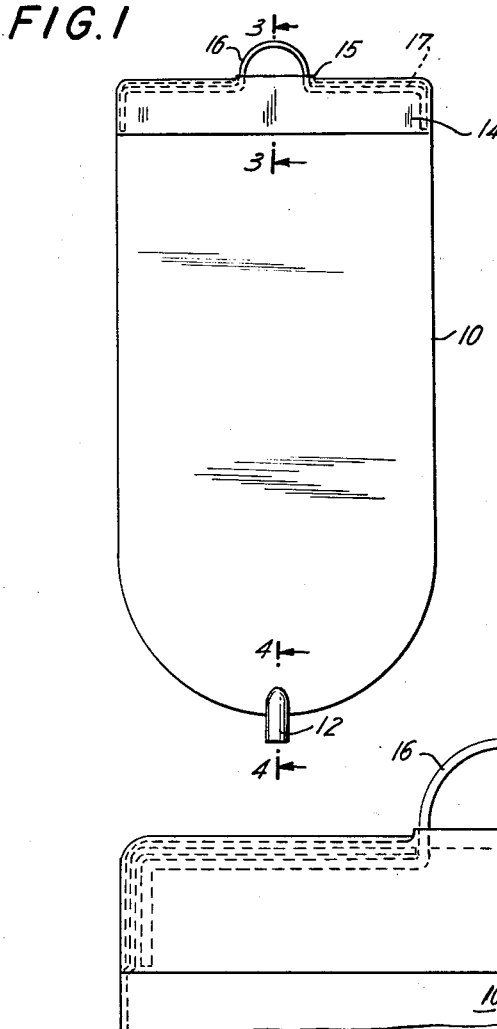
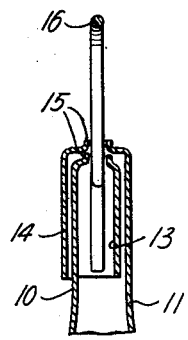
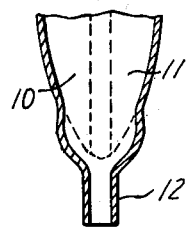
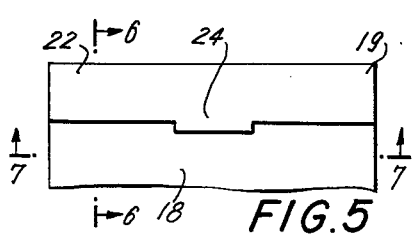
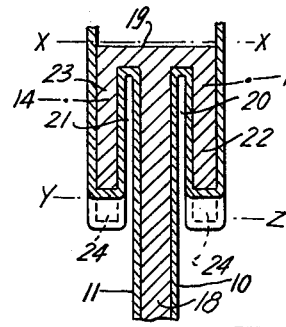
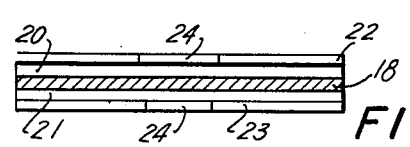
INVENTOR.
FRANK S. BUONO
BY
Kane, Dalsimer and Kane
ATTORNEYS

United States Patent Office 3,155,134
Patented Nov. 3, 1964

3,155,134
BAG AND METHOD OF MAKING THE SAME
Frank S. Buono, Garfield, N.J., assignor to Becton, Dickinson and Company, Rutherford, N.J., a corporation of New Jersey
Filed Dec. 22, 1961, Ser. No. 161,724
3 Claims. (Cl. 150—7)

This invention relates to a structurally and functionally improved bag or receptacle capable to use in various associations and of especial value when forming a part of an enema administration or similar set. Also, the present invention involves the teaching of a new method by means of which a bag may be efficiently and economically produced.

It is a primary object of the invention to furnish a unit which may be filled with a desired liquid and thereafter readily transported and conveniently suspended.

Moreover, the bag will be capable of being readily filled and so filled will include a splash-proof closure so that it may be transported without the exercise of undue care.

An additional object is that of teaching a method of manufacture which may be practiced by relatively unskilled personnel and by means of which the desired articles may be efficiently and economically produced.

With these and other objects in mind, reference is had to the attached sheet of drawings illustrating practical embodiments of the invention and in which:

FIG. 1 is a side elevation of a bag;

FIG. 2 is a partly sectional and fragmentary side view in enlarged scale of the top portion of the bag;

FIGS. 3 and 4 are similar sectional views taken respectively along the lines 3—3 and 4—4 in the direction of the arrows as indicated in FIG. 1;

FIG. 5 is a fragmentary side view of the upper portion of a mold for forming the unit;

FIG. 6 is a transverse sectional view of that mold and associated bag part taken along the line 6—6 in the direction of the arrows as indicated in FIG. 5; and FIG. 7 is a sectional bottom view taken along the line 7—7 in the direction of the arrows as indicated in FIG. 5.

The bag or receptacle is made of liquid impervious material, and specifically a thermoplastic such as vinyl. Preferably, it is produced by a dip process employing a mold which is immersed in liquid plastic in a manner such that the latter deposits upon the mold to a thickness adequate to provide a bag embodying a proper body portion as well as parts adjacent thereto. To this end, the mold may be immersed within the liquid plastic and withdrawn therefrom a requisite number of times with proper intervening periods during which the plastic material may "set" for a proper time interval. If a receptacle is to be produced which will form a part of an enema or similar administration set then a bag structure, as shown especially in FIGS. 1–4, inclusive, may be conveniently employed.

Thus, referring to these figures, the receptacle would include a bag-shaped body embracing side walls 10 and 11 which are connected through their bottom and side edges to furnish a proper receptacle, as shown in FIG. 1. A discharge tube 12 connects with the base of the bag and may be suitably connected to or form a part of a tube in an administration set including the bag or receptacle. The upper edges of side walls 10 and 11 terminate in flaps which are folded upon themselves to provide pocket portions or members 13 and 14, with the former disposed within the latter.

As shown particularly in FIGS. 2 and 3, these pocket portions are coextensive with side walls 10 and 11, and have base portions extending upwardly from those side walls. Each of those portions is formed with an opening preferably defined by upwardly extending lips 15; the two openings being aligned with each other.

Preferably, a separate and relatively rigid handle forms a part of the receptacle assembly. This handle conveniently includes (as in FIG. 2) a central loop portion 16 from which arm 17 extends in opposite directions and in substantial alignment with each other. These arms terminate in end portions projecting at right angles with respect thereto to bear against the adjacent surfaces of the inner pocket members and retain them in properly taut condition. The loop 16 projects through the openings defined by lips or beads 15 with the end portions 17 of the handle being within the pocket 13 coextensive with side wall 10. Portions 17 of the handle bear against the base of this pocket throughout a distance adequate to assure a proper support of the receptacle even with the latter filled to capacity with a desired liquid. Under ordinary conditions of transportation, a separate handle need not necessarily be used. Rather, the pocket members as defined by the flaps may serve as a zone providing a handle.

If used alone or in association with a separate handle, as illustrated, the flap portions will furnish an adequate support for the receptacle, whether it is being carried or is hanging at bed side, or otherwise. In all events, the pocket structure provided will furnish a splash-proof closure which allows handling and transportation of the filled receptacle without the exercise of undue care. If a vinyl formulation is employed, it should be non-toxic and preferably clear. Suitable indicia such as volume graduations may be applied to the receptacle if desired. It will be apparent that the receptacle or bag in unfilled condition will present a substantially flat body which may be readily stored to occupy a minimum amount of space.

In accordance with the present teachings, the receptacle is formed by a dipping process. To this end, a mold is employed which, as in FIGS. 5, 6 and 7, will include a central body portion 18 to the upper end of which a head 19 is attached. That head will present in its underface grooves 20 and 21 disposed one to each side of the surfaces of body portion 18. The outer walls of the grooves are defined by downwardly extending flange portions 22 and 23. The length of flange 22 should be equal to the length of flange 23. Extensions 24 preferably depend downward from the central areas of each of the flanges. The purpose of the extension 24 is to form tabs at the center and top of each flap, which when cut off, yield openings through which the hanger loop is passed.

The mold embodying structures such as the foregoing is immersed within and withdrawn from a body of liquid plastic a suitable number of times. A thickness of material will be present adequate to provide the bag and adjacent portions of the receptacle with proper strength characteristics incorporated therein. Material layers as shown in FIG. 6 result; the bottom portion of body 18 together with the corresponding receptacle body not having been shown.

When a proper thickness of material has been developed, then the mold is no longer immersed in the liquid. Thereupon, the material is cured and stripped from that mold. Severance of excess material along the line X—X and lines Y and Z as indicated in FIG. 6 is resorted to. This results in the formation of flap portions embodying proper pocket structures facing in an upward direction, as indicated in FIG. 6. The end of 12 is also trimmed.

Thereafter, the flap portions are swung upwardly to be coextensive with the side walls of the receptacle. As a consequence, a structure as shown in FIGS. 2 and 3 will result with the openings in the base portions of the pockets aligned with each other and defined by lips or beads 15. No difficulty will be experienced in disposing pocket member 13 within the corresponding member 14 and maintaining them in a flattened condition because of the material's ability to elongate or stretch.

Before disposing pocket portion 13 within portion 14, loop 16 may have been passed through the opening in the base of that pocket portion with the bar parts 17 extending in contact with the base as shown in FIG. 2. Thereupon, loop portion 16 may be passed through the opening in the base of pocket 14 as the latter receives pocket portion 13. Otherwise, a functionally eqivalent suspending member may be employed, or, in fact, by simply grasping the flap zones of the receptacle, they will serve as a handle for transporting it.

In any event, a closure is provided which is splash proof should the receptacle be transported in a filled condition. It is also apparent that should it be desired to incorporate indicia in the receptacle to register liquid volume within the same this may be done in a number of different manners.

Thus, among others, the several objects of the invention as aforenoted are achieved. It is apparent that numerous changes in structure and variations in the steps of the method might be resorted to without departing from the spirit of the invention as defined by the claims.

I claim:

1. An irrigation bag comprising: front and back panels of flexible liquid impervious material connected together along their bottom edges and the major portion of the side edges and free from connection at their upper edges and the upper portion of the side edges providing a liquid tight envelope with an opening at the top; and a protective and supporting closure for said envelope including a first flap having its upper edge connected to the upper edge of one of said panels and its side edges secured to the upper portion of the side edges of said panel with the flap extending downwardly between the panels when in closed position, and a second flap having its upper edge connected to the upper edge of the other panel and its side edges secured to the upper portion of the side edges of the other panel with the second flap extending over the upper edge and embracing the upper portion of the outer surface of the opposite panel when in closed position.

2. An irrigation bag as set forth in claim 1 in which registering openings are provided in the connections between the upper edges of the panels and the first and second flaps and a rigid transverse supporting member is provided inside said first flap with a loop-shaped portion extending outwardly through the openings to suspend the bag.

3. An irrigation bag as set forth in claim 1 having an outlet opening adjacent its lower edge with means for connecting a flexible tube thereto.

References Cited in the file of this patent
UNITED STATES PATENTS

| | | |
|---|---|---|
| 2,001,594 | Tritt | May 14, 1935 |
| 2,078,913 | Strickhouser et al. | Apr. 27, 1937 |
| 2,273,128 | Madsen et al. | Feb. 17, 1942 |
| 2,583,381 | Leguillon | Jan. 22, 1952 |
| 3,017,070 | London | Jan. 16, 1962 |
| 3,074,451 | Whitney | Jan. 22, 1963 |

FOREIGN PATENTS

| | | |
|---|---|---|
| 18,014 | Great Britain | of 1909 |
| 466,925 | Italy | Nov. 21, 1951 |